US012030756B2

(12) United States Patent
Murru et al.

(10) Patent No.: US 12,030,756 B2
(45) Date of Patent: Jul. 9, 2024

(54) VEHICLE LIFT

(71) Applicant: Vehicle Service Group Italy S.R.L., Ostellato (IT)

(72) Inventors: Alberto Murru, Pianoro (IT); Sandro Ramponi, Porotto (IT); Pasquale Digesù, Modena (IT)

(73) Assignee: Vehicle Service Group Italy, S.R.L., Ostellato (IT)

( * ) Notice: Subject to any disclaimer, the term of this patent is extended or adjusted under 35 U.S.C. 154(b) by 0 days.

(21) Appl. No.: 17/509,307

(22) Filed: Oct. 25, 2021

(65) Prior Publication Data

US 2023/0130107 A1 Apr. 27, 2023

(51) Int. Cl.
*B66F 7/28* (2006.01)
*B66F 7/04* (2006.01)

(52) U.S. Cl.
CPC .................. *B66F 7/28* (2013.01); *B66F 7/04* (2013.01); *B66F 2700/123* (2013.01)

(58) Field of Classification Search
CPC ......... B66F 7/28; B66F 7/04; B66F 2700/123
See application file for complete search history.

(56) References Cited

U.S. PATENT DOCUMENTS 3,059,726 A 10/1962 Koopman
3,315,764 A 4/1967 Clarke
3,536,162 A * 10/1970 Clarke ...................... B66F 7/16 187/220
4,212,449 A * 7/1980 Tsujimura ................. B66F 7/04 187/219
4,825,977 A 5/1989 Isogai
4,976,336 A * 12/1990 Curran ...................... B66F 7/04 187/209
5,954,160 A 9/1999 Wells, Sr. et al.
7,150,073 B2 * 12/2006 Stewart ............... E05D 11/1007 16/354
9,145,283 B2 * 9/2015 Oehm .................... B23Q 5/385
9,714,160 B2 * 7/2017 Benz ......................... B66F 3/02
9,840,402 B2 12/2017 Horimizu
(Continued)

FOREIGN PATENT DOCUMENTS

CN 111994828 A * 11/2020 ................ B60S 5/00
DE 202013102803 U1 * 11/2014 ............. B66F 13/00
(Continued)

OTHER PUBLICATIONS

Extended European Search Report in European Appln. No. 22198153.3, dated Mar. 27, 2023, 8 pages.

*Primary Examiner* — Michael R Mansen
*Assistant Examiner* — Michelle M Lantrip
(74) *Attorney, Agent, or Firm* — Fish & Richardson P.C.

(57) ABSTRACT

A vehicle lift comprising a column, a carriage slidingly movable along said column, a lift arm hinged to the carriage. The lift arm has a base body, a distal body rotatably mounted to the base body, and a lock with an insert movable between a release position, where the insert allows relative rotation between the base body and the distal body, and a gripping position, where the insert prevents relative rotation between said bodies. The insert is slidingly movable relative to the base body and/or the distal body along a trajectory parallel to at least one of a section of the extension path of the base body and a section of the extension path of the distal body.

18 Claims, 6 Drawing Sheets

(56) References Cited

U.S. PATENT DOCUMENTS

| | | | | |
|---|---|---|---|---|
| 2013/0233651 | A1* | 9/2013 | Kritzer | B66F 3/46 187/208 |
| 2016/0122168 | A1* | 5/2016 | Benz | B66F 7/28 254/133 R |
| 2019/0276287 | A1 | 9/2019 | Huber et al. | |
| 2020/0079627 | A1 | 3/2020 | Perlstein | |
| 2020/0115206 | A1* | 4/2020 | Benz | F16C 19/502 |
| 2020/0148517 | A1* | 5/2020 | Nussbaum | B66F 7/025 |
| 2021/0114852 | A1* | 4/2021 | Heath | B66F 7/28 |
| 2021/0171327 | A1* | 6/2021 | Mailhot | B66F 7/02 |
| 2021/0331904 | A1* | 10/2021 | Kritzer | B66F 7/28 |
| 2022/0017342 | A1* | 1/2022 | Kritzer | B66F 3/46 |
| 2022/0106173 | A1* | 4/2022 | Huber | B66F 7/28 |
| 2022/0212907 | A1* | 7/2022 | Rossato | B66F 7/04 |

FOREIGN PATENT DOCUMENTS

| | | | | |
|---|---|---|---|---|
| DE | 202014004621 | | 9/2015 | |
| DE | 102017108064 | A1 * | 10/2018 | B66F 3/46 |
| DE | 102018215155 | A1 * | 3/2020 | |
| EP | 0478035 | A1 * | 4/1992 | |
| EP | 1357079 | | 10/2003 | |
| FR | 2265667 | | 10/1975 | |
| FR | 2337098 | | 7/1977 | |
| GB | 768388 | | 2/1957 | |
| GB | 1395039 | | 5/1975 | |
| JP | 2002128483 | A * | 5/2002 | |
| JP | 2003267198 | A * | 9/2003 | |
| JP | 4794034 | B2 * | 10/2011 | |
| JP | 2018203381 | A * | 12/2018 | |
| KR | 920001836 | Y1 * | 3/1992 | B60S 5/00 |
| WO | WO 2021/063868 | | 4/2021 | |

* cited by examiner

FIG.2
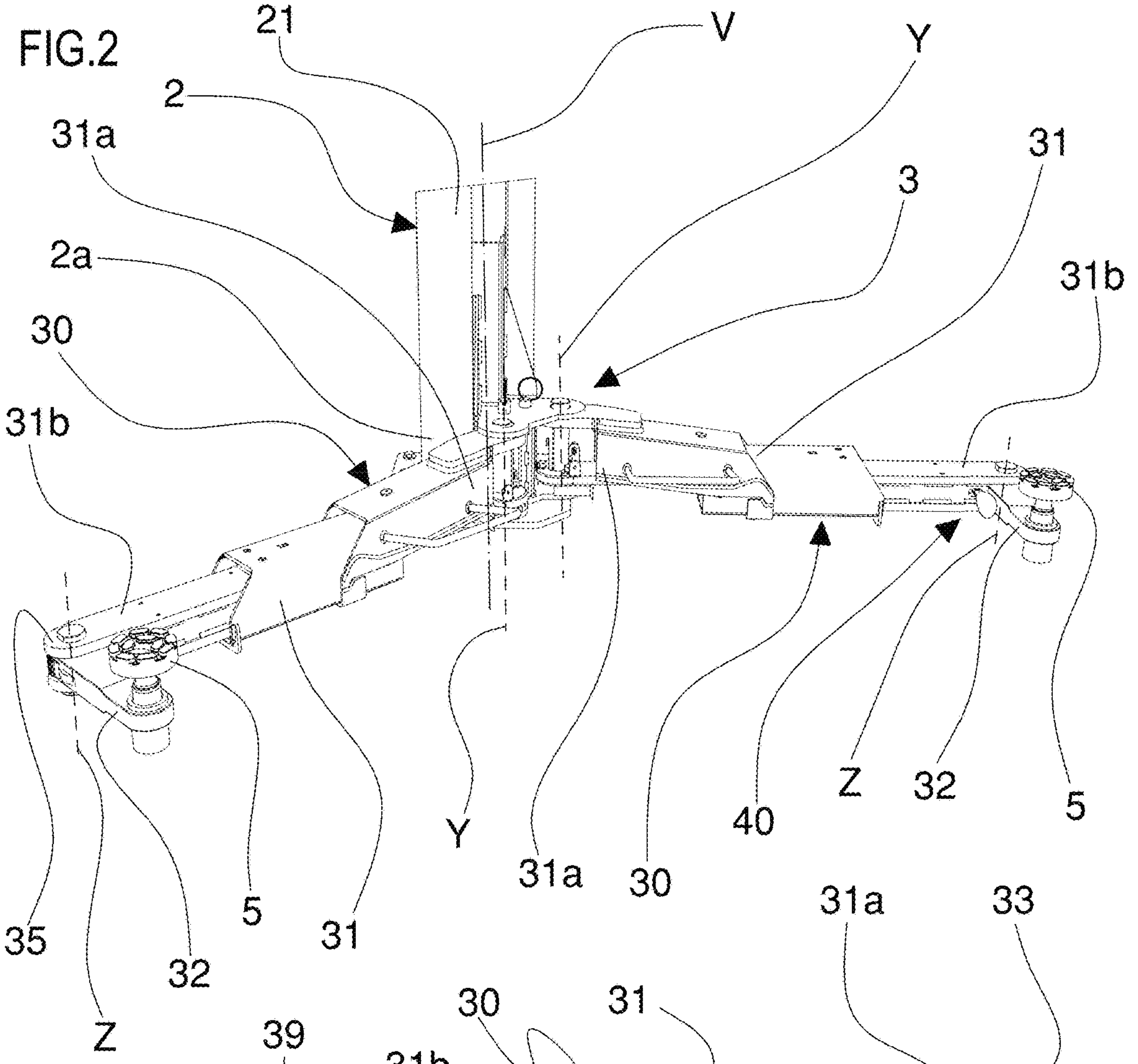
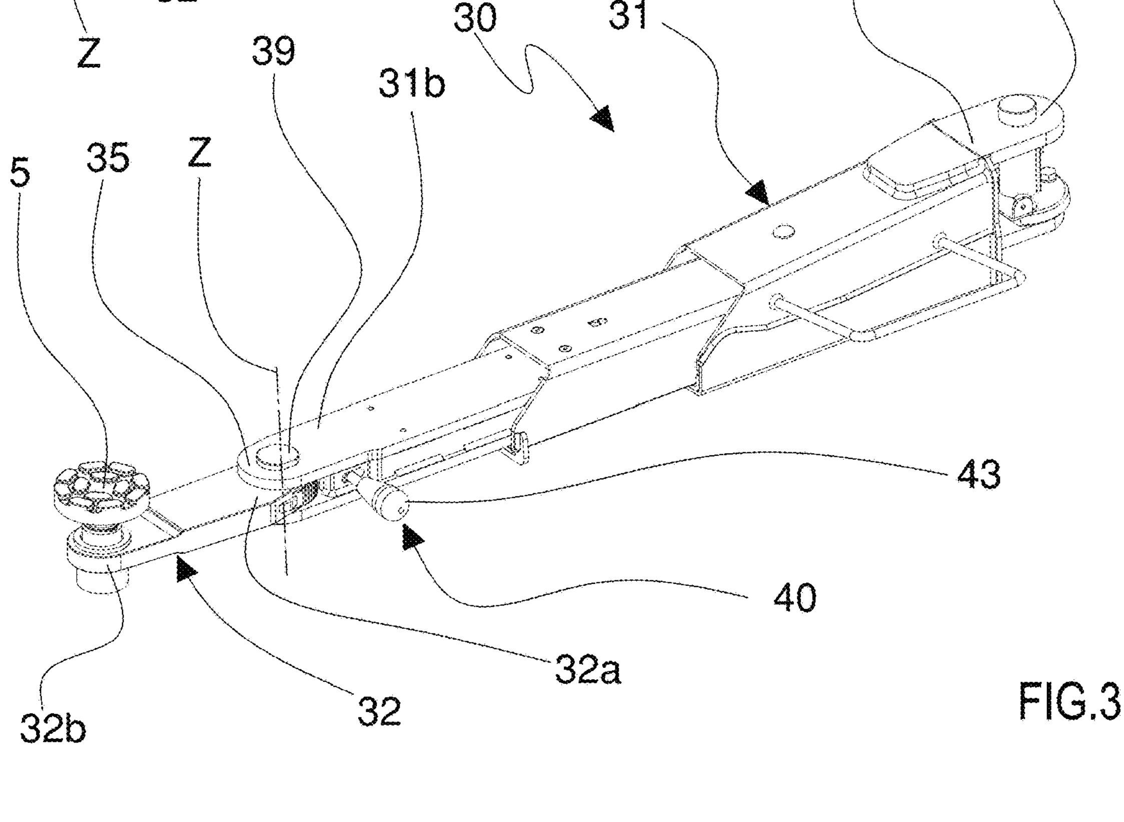
FIG.3

FIG.4
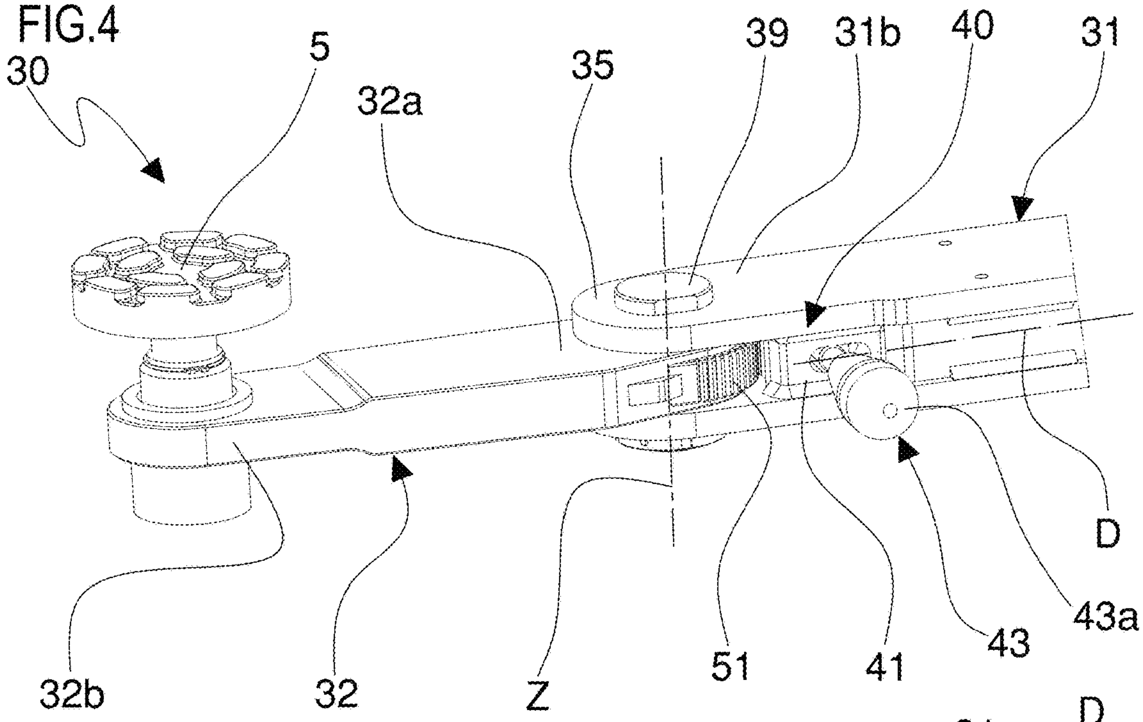
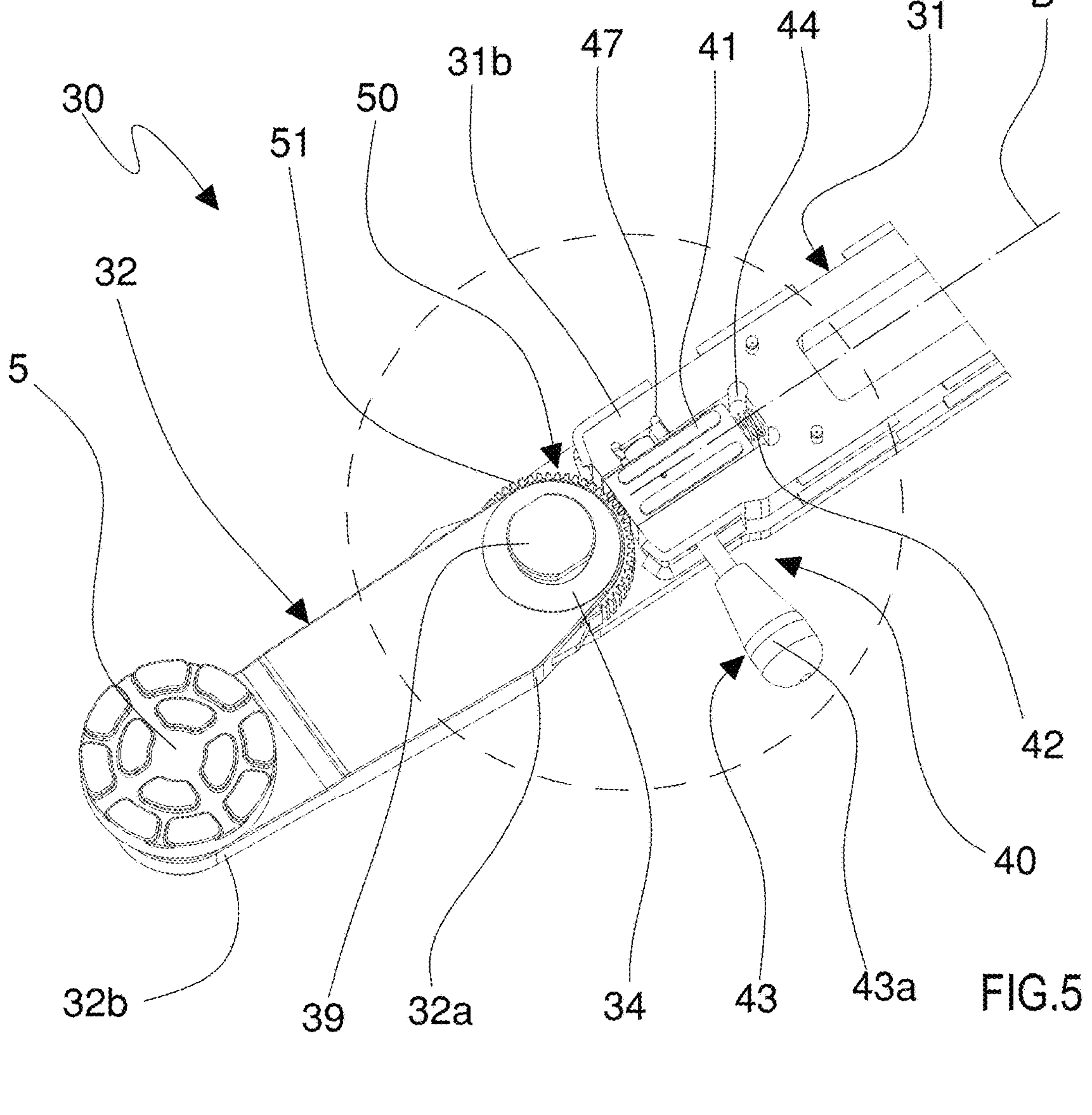
FIG.5

FIG.5A
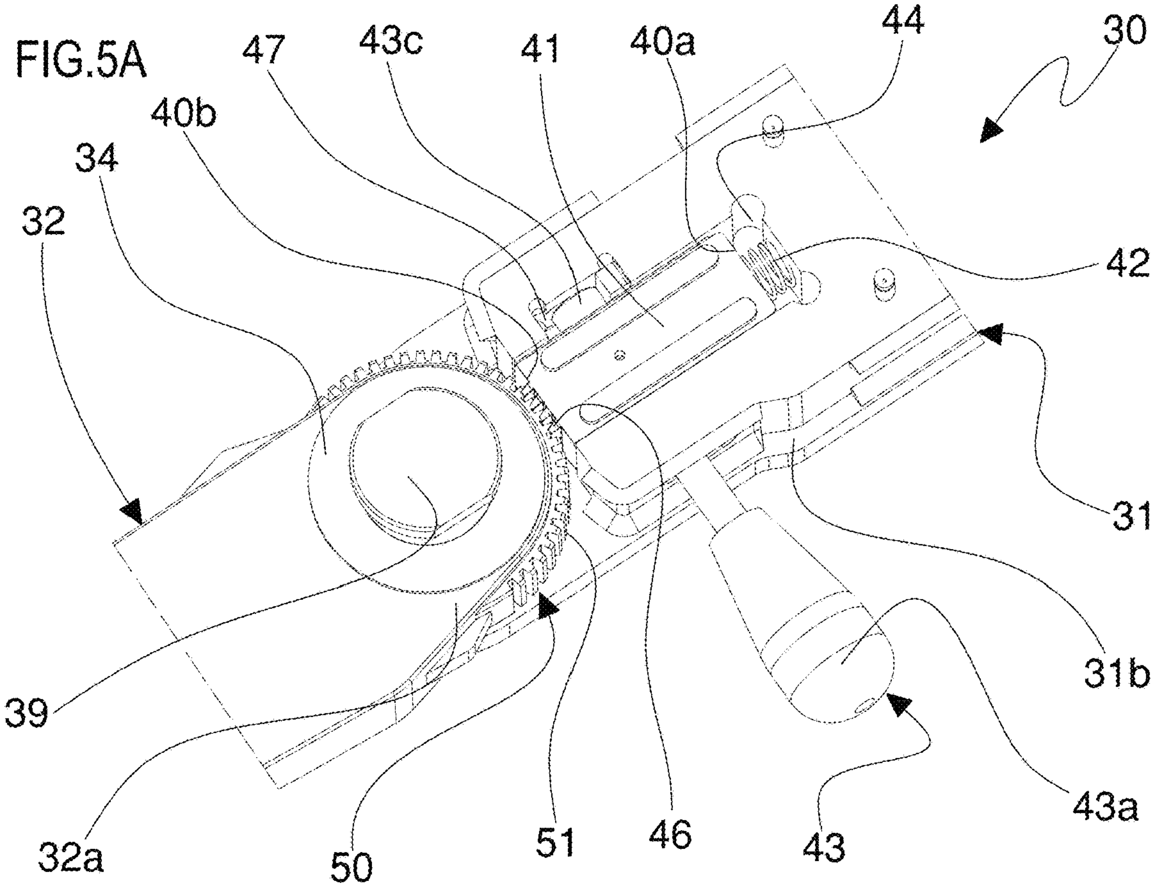
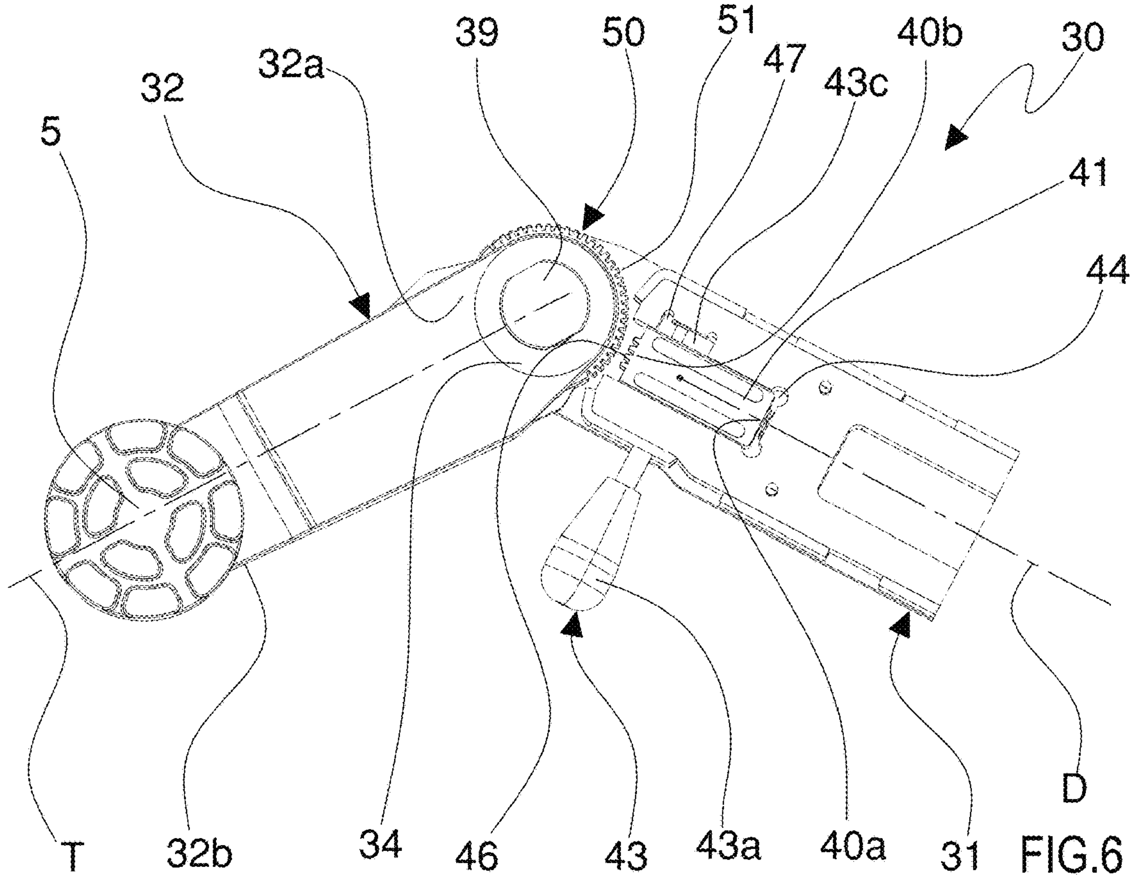
FIG.6

VEHICLE LIFT

FIELD OF THE INVENTION

The present invention relates to a vehicle lift and a process for lifting vehicles using said lift. The present invention may be used in the automotive field for servicing vehicles. However, the present invention may also be employed for lifting various types of vehicles, including cars, trucks, agricultural vehicles or other.

BACKGROUND

Column lifts comprise one or more vertical support columns, each of which stably carries a carriage provided with a pair of adjustable and/or extendable arms: the ends of the arms are provided with height-adjustable pads configured to receive the vehicle to be lifted. The movement of each carriage may be performed by electromechanical systems, e.g., an electric motor operating on a mother-screw type system, or by hydraulic cylinders.

U.S. Patent Application No. US 2020/0079627 A1 describes a two-column lift comprising, for each column, two telescopic lift arms hinged to a carriage vertically movable along the respective column. Each arm extends along a rectilinear direction and terminally carries an adapter configured to contact a vehicle to allow lifting; the adapter is hinged to the arm. In detail, the adapter is coupled to the telescopic arm by means of a pin: rotation between the adapter and the arm may be locked by a further pin insertable through appropriate holes defined on respective plates of the adapter and the telescopic arm.

US patent application No. US 2019/0276287 A1 describes a two-column lift comprising, for each column, a first and a second arm hinged to a carriage vertically movable along the respective column. The first arm may be telescopic and extends along a rectilinear direction; the second arm includes a base body, directly hinged to the carriage, and a distal body hinged to the base body: the distal body includes a height adjustable support configured to contact a vehicle. In detail, the base body and the distal body of the second arm are equal in length and hinged at an intermediate joint. Relative rotation between the base body and the distal body of the second arm may be locked by a lever carried by the base body engaging a toothed disc on the second articulated arm.

Although known lifts are widely used, they are nevertheless susceptible of improvements.

SUMMARY

One aspect concerns a lift arm (30) for vehicle lifts (1), said lift arm (30) comprising:

- at least one base body (31) extending between respective first and second end portions (31*a*, 31*b*) along a respective extension path (D),
- at least one distal body (32) extending between respective first and second end portions (32*a*, 32*b*) along a respective extension path (T), wherein the distal body (32) is rotatably mounted to the base body (31) for relative rotation about at least one axis (Z),
- at least one lock (40) configured to selectively block the relative rotation between the base body (31) and the distal body (32).

In an aspect according to the preceding aspect, the lock (40) comprises at least one insert (41) movable at least between:

- a release position wherein said insert (41) allows the relative rotation between said base body (31) and said distal body (32), and
- a gripping position wherein said insert (41) blocks the relative rotation between said base body (31) and said distal body (32).

In an aspect according to the preceding aspect said insert (41) is carried by at least one of the base body (31) and the distal body (32). In an aspect according to any one of the preceding aspects the insert is slidingly moveable with respect to at least one of the base body and the distal body between the gripping position and the release position, and vice versa, along at least one movement trajectory. In an aspect according to the preceding aspect the movement trajectory is substantially parallel to at least one of a section of the extension path of the base body (31) and a section of the extension path of the distal body (32).

In an aspect according to any one of the preceding aspects the extension path (D) of the base body (31) is rectilinear.

In an aspect according to any one of the preceding aspects the extension path (T) of the distal body (32) is rectilinear.

In an aspect according to any one of the preceding aspects, the insert (41) is slidingly movable between the gripping position and the release position, and vice versa, along a movement trajectory substantially parallel to at least one of the extension path (D) of the base body (31) and the extension path (T) of the distal body (32).

In an aspect according to any one of the preceding aspects, the second end portion (31*b*) of the base body (31) is hinged to the distal body. In an aspect according to any one of the preceding aspects, the second end portion (31*b*) of the base body (31) is hinged to the first end portion (32*a*) of the distal body (32).

In an aspect according to any one of the preceding aspects, the axis (Z) of relative rotation between the base body (31) and the distal body (32) is orthogonal to the extension path (D) of the base body (31).

In an aspect according to any one of the preceding aspects, the base body (31) and the distal (32) are constrained by means of a hinge type constraint. In an aspect according to the preceding aspect, the hinge is of a plane type.

In an aspect according to any one of the preceding aspects the axis (Z) of relative rotation between the base body (31) and the distal (32) is orthogonal to the extension path (T) of the distal (32). In an aspect according to any one of the preceding aspects the axis (Z) of relative rotation between the base body (31) and the distal body (32) is orthogonal to the extension path (D) of the base body (31).

In an aspect according to any one of the preceding aspects, the base body (31) and the distal body (32) are movable at least between:

- an aligned position wherein the extension paths (D, T) respectively of the base body (31) and the distal body (32), are substantially parallel to each other,
- an offset position wherein the extension paths (D, T) respectively of the base body (31) and the distal body (32), are angularly offset from each other.

In an aspect according to any one of the preceding aspects, in the offset position, the extension paths (D, T) respectively of the base body (31) and the distal body (32) intersect.

In an aspect according to any one of the preceding aspects, in the offset position, the extension paths (D, T) of the base body (31) and the distal body (32) respectively define an ideal plane. In an aspect according to any one of the preceding aspects the extension paths respectively of the base body and the distal body, in the offset position, intersect on an ideal plane. In an aspect according to the preceding aspect, the axis (Z) of relative rotation between the base body (31) and the distal body (32) is orthogonal to said ideal plane.

In an aspect according to any one of the preceding aspects the insert (41) is carried by the base body (31). In an aspect according to any one of the preceding aspects the insert (41) is slidingly movable between the gripping position and the release position, and vice versa, along a movement trajectory substantially parallel to the extension path (D) of the base body (31).

In an aspect according to any one of the preceding aspects the insert comprises at least one engagement portion constraining an engagement portion of the distal body and selectively blocking the relative rotation between the distal body and the base body. In an aspect according to any one of the preceding aspects the insert (41) comprises at least one engagement portion (46), wherein the distal body (32) comprises a respective engagement portion (50), wherein the engagement portion (46) of the insert (41), in the gripping position, constrains the engagement portion (50) of the distal body (32) to block the relative rotation between said distal body and the base body (31).

In an aspect according to any one of the preceding aspects, the engagement portion (46) of the insert (41) comprises at least one tooth (46*a*) configured to cooperate with a toothed profile (51) of the engagement portion (50) of the distal body (32).

In an aspect according to any one of the two preceding aspects, the engagement portion (46) of the insert (41) comprises a plurality of teeth (46*a*) configured to cooperate with a toothed profile (51) of the engagement portion (50) of the distal body (32).

In an aspect according to the preceding aspect the plurality of teeth (46*a*) of the engagement portion (46) of the insert (41) are aligned along a transverse direction, optionally orthogonal, to the movement direction of the insert (41). In an aspect according to the two preceding aspects, the plurality of teeth (46*a*) of the engagement portion (46) of the insert (41) are aligned along an alignment direction, which is parallel to the ideal plane.

In an aspect according to the preceding five aspects, the toothed profile (51) of the engagement portion (50) of the distal body (32) comprises a plurality of teeth aligned along an arc. In an aspect according to the preceding aspect the plurality of teeth of the engagement portion (50) of the distal body (32), in the gripping position of the insert (41), are configured to cooperate with the at least one tooth of the engagement portion (46) of the insert (41) to block the relative rotation between the base body (31) and the distal body (32).

In an aspect according to any one of the preceding aspects, the arc of alignment of the plurality of teeth of the toothed profile (51) lies in a plane substantially parallel to the ideal plane.

In an aspect according to any one of the preceding aspects, the toothed profile (51) is defined at the first end portion (32*a*) and faces the base body (31). In an aspect according to any one of the preceding aspects, the toothed profile (51) faces the insert (41). In an aspect according to any one of the preceding aspects the toothed profile (51) faces the at least one tooth (46*a*) of the insert (41).

In one aspect according to any one of the preceding aspects, the insert (41) extends substantially between:

a head surface (40*b*) facing the distal body (32), and a bottom surface (40*a*) facing towards the first end portion (31*a*) of the base body (31), wherein the engagement portion (46) of the insert (41) emerges from the head surface (40*b*) towards distal body (32).

In an aspect according to any one of the preceding aspects, the insert (41) is configured to normally maintain the gripping position. In an aspect according to any one of the preceding aspects, the lock (40) comprises at least one return element (42) in contact, on one side, with the base body (31) and, on the other side, with the insert (41), wherein the return element (42) is configured to normally maintain the insert in the gripping position.

In an aspect according to any one of the preceding aspects the return element (42) is of an elastic return element. In an aspect according to any one of the preceding aspects the return element (42) comprises at least one of: a torsion spring, a compression spring, a tension spring, an air spring, a leaf spring.

In an aspect according to any one of the preceding aspects, the return element (42) thrusts the bottom surface (40*a*) of the insert (41) to force said insert, optionally the engagement portion (46) of the insert (41), against the engagement portion (50) of the distal body (32).

In an aspect according to any one of the preceding aspects, the return element (42) is configured to push the at least one tooth (46*a*) of the engagement portion (46) of the insert (41) against the toothed profile (51) of the engagement portion (50) of the distal body (32).

In an aspect according to any one of the preceding aspects, the base body (31), at the second end portion (31*b*), has a seat (44), wherein the insert (41) is slidingly engaged in the seat.

In an aspect according to any one of the preceding aspects, the insert (41), at least in the release position, is entirely housed in the seat (44) of the base body (31). In an aspect according to any one of the preceding aspects the seat (44) of the base body (31) has a substantially U-shaped profile. In an aspect according to any one of the preceding aspects the seat of the base body has a profile with concavity directed towards the distal body. In an aspect according to any one of the preceding aspects the seat (44) of the base body (31) is an open seat, optionally being bounded by an open profile. In an aspect according to any one of the preceding aspects, the seat directly faces the toothed profile (51) of the engagement portion (50) of the distal body (32).

In an aspect according to any one of the preceding aspects the insert (41) is at least partially counter-shaped to the seat (44) of the base body (31). In an aspect according to any one of the preceding aspects the insert (41) substantially has a rectangular parallelepiped shape.

In an aspect according to any one of the preceding aspects, the lock (40) comprises at least one maneuvering element (43) engaged to the insert (41) and emerging from at least one of the base body (31) and the distal body (32), said maneuvering element (43) being configured to move the insert (41) at least between the gripping position and the release position.

In one aspect according to the preceding aspect, the maneuvering element (43) comprises:

a thrust portion (43*b*) directly engaged to the insert (41), a lever (43*a*) configured to allow an operator a manual movement of the insert (41) at least between the gripping position and the release position.

In an aspect according to any one of the preceding aspects, the insert (41) comprises at least one seat (41*a*) within which the maneuvering element (43) is engaged. In an aspect according to the preceding aspect the thrust portion (43*b*) of the maneuvering element (43) is engaged within the seat (41*a*) of the insert (41).

In an aspect according to any one of the preceding aspects the maneuvering element (43) is engaged to the insert (41) and the base body (31). In an aspect according to any one of the preceding aspects the maneuvering element (43) emerges from the second end portion (31*b*) of the base body (31).

In an aspect according to any one of the preceding aspects, the base body (31) has a recess (47) bounded by at least one contrast wall, wherein said maneuvering element (43) comprises at least one support end (43*c*) configured to contact the contrast wall of the recess (47) to allow an operator, during (optionally manual) movement of the maneuvering element (43) from the gripping position to the release position, to leverage the contrast wall of the base body (31).

In an aspect according to the previous aspect the recess (47) is placed at the side of the seat of the same base body (31). In aspect according to the two preceding aspects the recess (47) is in communication with the seat (44). In an aspect according to the three preceding aspects the recess (47) and the seat (44) of the base body (31) are in communication with each other and define a single pocket suitable for receiving the insert (41) and at least part of the maneuvering element (43). In an aspect according to any one of the preceding aspects, the support end (43*c*) of the maneuvering element is opposite with respect to the lever (43*a*).

In an aspect according to any one of the preceding aspects the seat (41*a*) of the insert (41) has a cylindrical shape.

In an aspect according to any one of the preceding aspects, the thrust portion (43*b*) of the gripping member (43) comprises a cylindrical pin, counter-shaped to the seat (41*a*) of the insert, engaged within said seat (41*a*).

In an aspect according to any one of the preceding aspects the base body (31) has a respective length defined by the maximum distance present between the first and second end portions (31*a*, 31*b*) of the base body (31), wherein the distal body (32) has a respective length defined by the maximum distance present between the first and second end portions (32*a*, 32*b*) of the distal body (32), wherein the length of the base body (31) is greater than the length of the distal body (32).

In an aspect according to the preceding aspect, the ratio between the length of the base body (31) and the length of the distal body (32) is greater than 3, optionally between 4 and 8.

In an aspect according to any one of the preceding aspects, the base body (31), at the second end portion (31*b*), has at least one through hole, wherein the distal body (32), at the first end portion (32*a*), has at least one respective through hole, wherein the lift arm (30) comprises at least one pin (39) engaged within the holes of the base body (31) and the distal body (32) configured to rotatably constrain said bodies (31, 32).

In an aspect according to any one of the preceding aspects, the base body (31), at the second end portion (31*b*), comprises at least one plate (35) having said at least one through hole. In an aspect according to any one of the preceding aspects, the distal body (32), at the first end portion (32*a*), comprises at least one respective plate (34) having the respective through hole. In an aspect according to any one of the preceding aspects, the plates (35, 34) of the base body (31) and the distal body (32) face each other, wherein the plate (35) of the base body (31) is hinged to the plate (34) of the distal body (32) by said pin (39).

In an aspect according to any one of the preceding aspects the base body (31), at the second end portion (31*b*), comprises two plates (35) spaced apart from each other and each having said at least one through hole, wherein the distal body (32), at the first end portion (32*a*), has at least one respective plate (34) having the respective through hole, the plate (34) of the distal body (32) being interposed between the two plates of the base body (31).

In an aspect according to any one of the preceding aspects, the lift arm (30) comprises at least one support (5) carried by the distal body (32) and configured to contact at least one vehicle (V) to enable lifting. In an aspect according to the preceding aspect, the support (5) is arranged at the second end portion (32*b*) of the distal body (32). In an aspect according to the two preceding aspects, the support (5) is movable with respect to the distal body (32) in approaching and receding. In an aspect according to the three preceding aspects, the support (5) is movable with respect to the distal body at least along a transverse direction, optionally orthogonal, to the ideal plane. In an aspect according to any one of the preceding aspects, the support (5) comprises at least one of: a support foot, a support disc, a support pin. In an aspect according to any one of the preceding aspects, the support (5) comprises a top portion made of a plastic material, for example rubber, configured to directly contact the vehicle.

In an aspect according to any one of the preceding aspects, the base body (31) is extendable. In an aspect according to any one of the preceding aspects the distance between the first and second end portions (31*a*, 31*b*) of the base body (31) is adjustable. In an aspect according to any one of the preceding aspects, the base body (31) has a first and a second end portions movable with respect to each other along the extension path (D) of the base body (31) itself to adjust a length of said base body (31). In an aspect according to any one of the preceding aspects the first and second end portions of the base body (31) are movable with respect to each other by means of at least one actuator (60). In an aspect according to the preceding aspect said actuator (60) comprises at least one of: a hydraulic cylinder, a pneumatic cylinder, an electric motor.

In an aspect according to any one of the preceding aspects, the base body (31) is of a hollow type and defines within it a housing compartment (A). In an aspect according to the preceding aspect, the actuator (60) is arranged within the housing compartment (A) of the base body (31).

In an aspect according to the four preceding aspects the first and second sections are hollow and define a respective housing compartment. In an aspect according to the preceding aspect the second section of the base body (31) is slidingly movable at least partially within the first section of the same base body (31). In an aspect according to the two preceding aspects, the actuator (60) is arranged within the housing compartments defined by the first and second sections of the base body (31). In an aspect according to the three preceding aspects the housing compartments of the first and second sections of the base body (31) are communicating and cooperatively define a single housing compartment (A) of the base body (31).

In one aspect, a vehicle lift (1) is provided, said vehicle lift (1) comprising:

- at least one column (2) extending, in use, along a vertical direction (V),
- at least one carriage (3) engaged to the column (2) and slidingly movable along said column (2), said carriage (3) comprising at least one lift arm (30) according to any one of the preceding aspects.

In an aspect according to the preceding aspect the lift (1) comprises at least two lift arms (30) for each column. In an aspect according to the preceding aspect each of the lift arms (30) is in accordance with any one of the preceding aspects.

In an aspect according to any one of the preceding aspects each lift arm (30) is hinged to the carriage (3) of the column (2). In an aspect according to any one of the preceding aspects each lift arm (30) is rotatably mounted to the carriage for relative rotation about at least one axis (Y) substantially parallel to the vertical direction of the at least column (2).

In an aspect according to any one of the preceding aspects said lift (1) comprises at least one movement system associated with the at least one column (2) and configured to move the carriage (3) along said column. In an aspect according to the preceding aspect said movement system comprises:

- at least one screw extending along at least one extension section of the column (2) and movable by rotation about an axis,
- at least one mother screw engaged to the screw and movable, following rotation of the screw, along said screw, said mother screw being engaged to the carriage and movable along the screw,
- at least one electric motor (7) cinematically connected to the screw, the electric motor is configured to rotate the screw.

In an aspect according to any one of the preceding aspects the column (2) extends between a base portion (2*a*) and a top portion (2*b*), wherein the electric motor (7) of the movement system is located at the top portion (2*b*) of the column (2).

In an aspect according to any one of the preceding aspects said lift comprises at least one casing (15) engaged to the column (2) and within which the electric motor (7) is at least partially housed. In an aspect according to the preceding aspect the casing (15) is placed externally to the column (2), optionally at the top portion (2*b*).

In an aspect according to any one of the preceding aspects the at least one column (2) comprises a first column and a second column spaced apart and parallel to each other. In an aspect according to any one of the preceding aspects the first column carries a first carriage (3) which is slidingly movable along said first column, said second column carries a second carriage (3) which is slidingly movable along said second column.

In an aspect is provided a process for lifting vehicles using a lift (1) according to any one of the preceding aspects.

In an aspect according to the preceding aspect the lifting process comprises the following steps:

- arrange at least one carriage (3) close to the ground on which this lift (1) is placed,
- place a vehicle above at least one lift arm (30),
- move the carriage (3) along the column (2) to bring the at least one lift arm (30) in contact with the vehicle (optionally with the vehicle body) to lift said vehicle with respect to the ground.

In an aspect according to the preceding aspect, the process comprises a step of orienting the distal body (32) with respect to the base body (31), said orientation step comprising the following sub-phases:

- place the insert (41) of the lock (40) in the release position such that said base body (31) and distal body (32) are respectively movable by rotation,
- rotate the distal body (32) with respect to the base body (31) around the respective axis (Z) to place said distal body at a desired angle with respect to the base body (31),
- place the insert (41) of the lock (40) in the gripping position so that the distal body (32) and base body (31) are blocked at the desired angle.

In an aspect according to the preceding aspect, the sub-step of placing the insert (41) in the release position comprises the steps of manually moving the lever (43*a*) of the operating element (43) such that the thrust portion (43*b*) acts on the insert (41) to disengage the at least one tooth (46*a*) thereof to the toothed profile (51) of the distal body (32). In an aspect according to any one of the preceding aspects of the process, the movement of the carriage (3) takes place by means of the drive of the electric motor (7). In an aspect according to any one of the preceding aspects of the process, the step of arranging the insert (41) of the lock (40) in the gripping position is performed by the return element (42) following the release of the lever (43).

In one aspect, is provided a use of the lift arm (30) according to any one of the preceding aspects for vehicle lifts of the column type.

An aspect concerns a process of servicing a vehicle using the lift or the arm according to any one of the preceding aspects.

In an aspect according to the preceding aspect the vehicle is an elect vehicle or a hybrid vehicle having a battery pack, wherein the process comprises lifting the vehicle, removing the battery pack from a vehicle body and lowering the battering back while maintaining the battery pack within a volume comprised between the lift arms of each column without interfering with the arms.

In an aspect according to the preceding aspect lowering the battery pack comprises lowering the battery pack along a vertical trajectory.

Various embodiments may advantageously feature a lift arm and a related vehicle lift having a simple and compact structure, which has low production costs and which at the same time is structurally robust, and able to safely and quickly lift a wide range of vehicles without damage.

BRIEF DESCRIPTION OF THE DRAWINGS

Some embodiments and some aspects of the invention will be hereafter described with reference to the attached exemplifying and therefore not-limiting drawings, in which:

FIG. 2 shows a detail of the lift in FIG. 1;

FIG. 3 is a perspective view of an arm of a lift according to the present invention;

FIG. 4 shows a detail of an arm of a lift according to the present invention;

FIGS. 5 and 5A show details of an arm of a lift according to the present invention with an arm insert in grip position;

FIG. 6 is a further view of a detail of an arm of a lift according to the present invention with an arm in release position;

DEFINITIONS AND CONVENTIONS

In the detailed description, corresponding parts illustrated in the various figures are indicated with same reference numbers. The figures could include representations that are not in scale; parts and components illustrated in the figures might be schematic representations.

The terms "horizontal" or "vertical", used in relation to components of the lift, refer to a condition of use of the lift during which the lift executes, or is usable, for executing raising/lowering of a vehicle.

DETAILED DESCRIPTION

Lift Arm 30

Reference number 1 indicates a lift arm for a vehicle lift. For example, the lift arm may be used in the automotive industry for lifting vehicles such as cars, trucks, agricultural vehicles, etc. As described below, the lift arm 30 is usable in association with at least one column of a vehicle lift to allow lifting of the vehicle with respect to the ground.

The lift arm 30 includes a base body 31 extending from a first to a second end portion 31*a*, 31*b* along an extension path D. The extension path D may be rectilinear. In greater detail, the base body 31 has an elongated conformation and a predetermined length defined by the maximum distance between the first and the second end portions 31*a*, 31*b*: the length of base body 31 may be, for example, equal to or greater than 500 mm, optionally comprised between 500 mm and 1200 mm.

Figure 8:
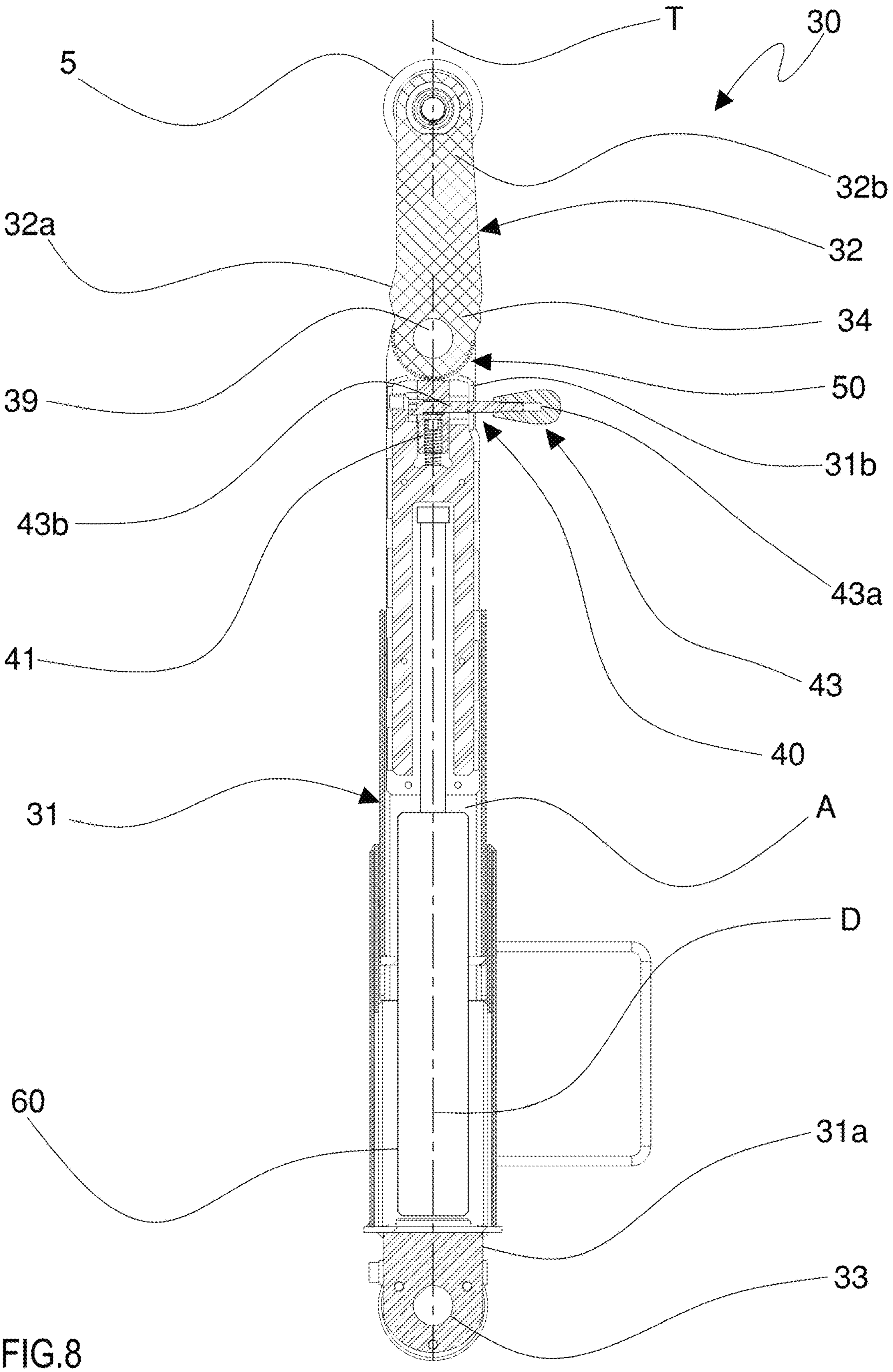

The length of base body 31 may be fixed or adjustable. In the accompanying figures, the lift arm 30 is extendable: thus, the distance between the first and second end portions 31*a*, 31*b* is adjustable, for example by means of an actuator 60 (FIG. 8). The actuator 60 may comprise a hydraulic cylinder, a pneumatic cylinder, an electric motor or other suitable device.

In particular, the base body 31 may have a first section and a second section, which are movable with respect to each other along the extension path D of the base body 31 to allow adjustment of the length of the base body 31.

For example, the first section may extend from the first end portion 31*a* a centerline portion of the base body 31 while the second section may extend from the centerline portion of the base body to the second end portion 31*b*.

The actuator 60 may be engaged, on one side, to the first section and, on the other side, to the second section: activation of the actuator 60 allows to move the two movable sections to allow the first and second end portions 31*a*, 31*b* to approach or move away from each other.

The base body 31 may be at least partly hollow and internally define a housing compartment A suitable for at least partly receiving said actuator 60: in such a configuration, the actuator 60 would be at least partly hidden within the base body 31, allowing the lift arm 30 to be extremely compact.

In particular, both the first section and the second section of the base body 31 may be hollow and internally define a respective housing compartment (see, for example, FIG. 8); the second section of the base body 31 may be placed at least partially within the first section and be slidingly movable at least partially within said first section of the same base body 31. The actuator 60 is arranged within the housing compartments defined by the first and second sections of the base body 31: the housing compartments of the first and second sections of the base body 31 communicate with each other and cooperate to define a single housing compartment A of the base body 31 (FIG. 8).

From a structural point of view, the base body 31 may present a box shape: for example, the base body may show a cross section, in plane orthogonal to the extension path D of the base body 31, having substantially square or rectangular shape. The mentioned cross section may be constant along the entire extension of the base body or it may, as illustrated in a non-limiting way in the accompanying figures, get smaller moving towards the second end portion. In particular, the first section of the base body may have cross section greater than the cross section of the second section of the same base body 31; in this way, the first section of the base body 31 may internally receive the second section of the base body and guide movement of the second section of the same base body 31. Obviously, the possibility of fixed, non-extendable, base body 31 is not excluded.

Figure 1:
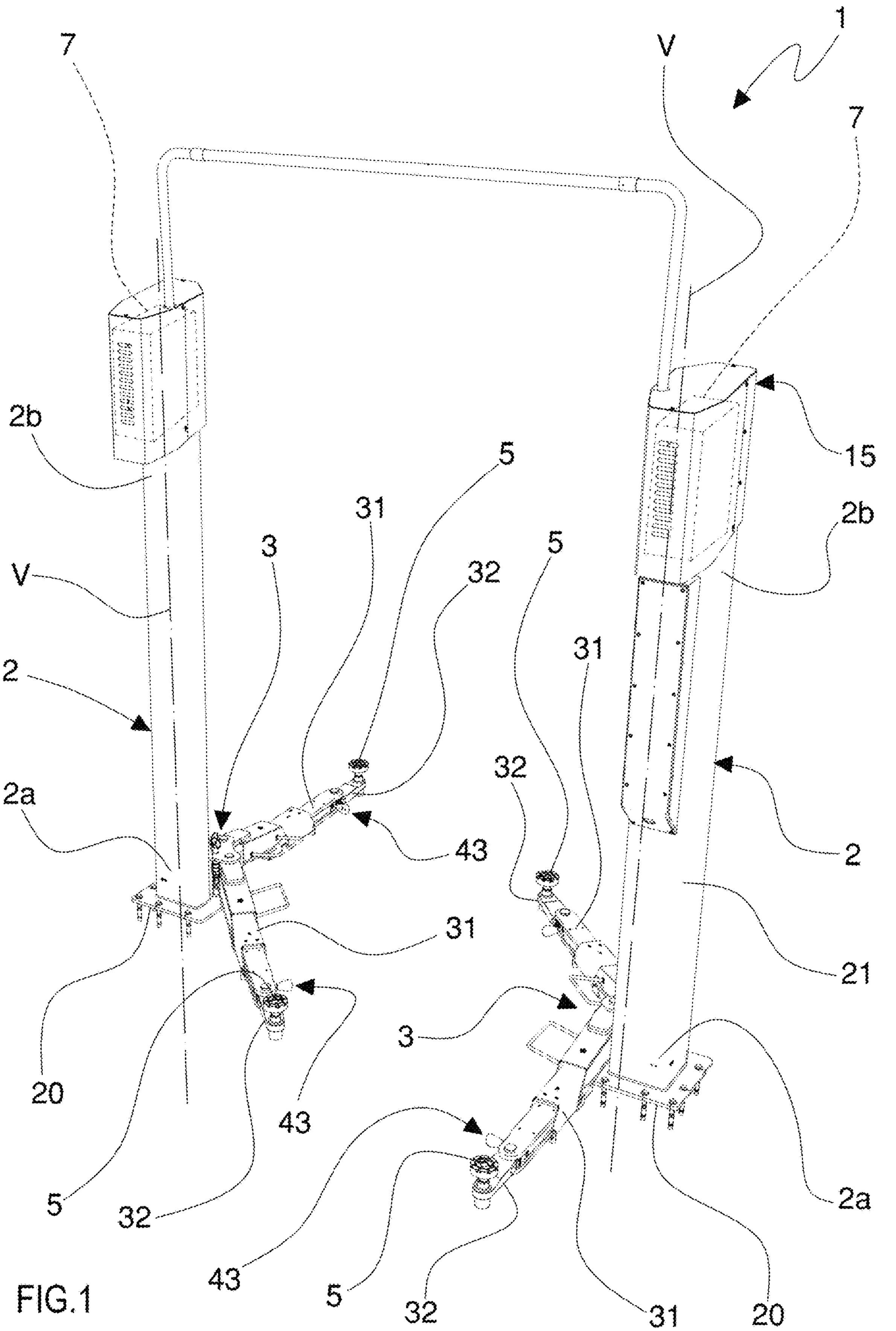
FIG. 1 is a perspective view of a lift according to the present invention.

As shown for example in FIG. 8, the base body 31 may comprise at least one attachment portion 33 configured for engagement of the lift arm 30 to at least one carriage 3 of a vehicle lift 1 as also represented in FIGS. 1 and 2. For example, the attachment portion 33 may comprise at least one plate suitable for being hinged, for example by means of a cylindrical pin, to a carriage 3 of a vehicle lift, such that the lift arm may turn with respect to the carriage about an axis Y, in particular orthogonal to the extension path of the base body 31.

On the opposite side, i.e., at the second end portion 31*b*, the base body 31 comprises an engagement portion coupling the base body 31 with a distal body 32 of the same lift arm 30. In particular, the engagement portion of the base body 31 comprises at least one plate 35 (see FIGS. 4 and 7) having at least one through hole for receiving a cylindrical pin 39 engaging the base body 31 with the distal body 32. In detail, the engagement portion of the base body 31 comprises two plates 35 spaced apart from each other, each of which has at least one through hole suitable to receive the cylindrical pin 39. The plate(s) 35 define the second end portion 31*b* of the base body 31 receiving and engaging the distal body 32.

The distal body 32 engaged to the base body 31 extends from a first end portion 32*a* to a second end portions 32*a*, 32*b* along a respective extension path T, which is optionally rectilinear (see for example FIGS. 6 and 8). In detail, the distal body 32 has an elongated conformation; the distal body 32 has a length defined by the maximum distance between the first and second end portions 32*a*, 32*b*: the length of the distal body may be equal to or greater than 100 mm, and may be optionally comprised between 100 mm and 500 mm. The length of the base body 31 is greater than the length of the distal body 32; for example, the ratio between the length of the base body 31 and the length of the distal body 32 may be greater than 3, and optionally between 4 and 8.

The base body 31 and the distal body 32 may relatively turn at least around an axis Z. The distal body 32 is optionally hinged to the base body 31 at the second end portion 31*b* of the base body 31. In detail, the base body 31 and the distal body 32 are hinged at the second end portion 31*b* of the base body 31 aid at the first end portion 32*a* of the distal body 32: the distal body 32 is thus an extension of the base body 31 relatively movable with respect to this latter. The Z-axis of relative rotation between the base body 31 and the distal body 32 is orthogonal to the extension path D of the base body 31: in particular, the Z-axis may be orthogonal to both extension paths D and T respectively of base body 31 and distal body 32. In detail, the base body 31 is coupled to the distal body 32 by a hinge joint allowing relative rotation of said bodies 31, 32 about a single axis, namely axis Z.

In greater detail, the base body 31 and the distal body 32 are movable at least between:

- an aligned position (FIGS. 3-5 and 8) where the extension paths D, T respectively of base body 31 and distal body 32, are substantially parallel to each other, an offset position (FIGS. 2 and 6) where the extension paths D, T respectively of base body 31 and distal body 32, are angularly offset from each other.

As shown in the accompanying figures, in the offset position, the extension paths D, T respectively of base body 31 and distal body 32 intersect and essentially define an ideal plane; the axis Z of rotation of base body 31 relative to distal body 32 is orthogonal to said ideal plane.

In the aligned position, the base body 31 and the distal body 32 define a maximum length of the lift arm which is therefore defined by the maximum distance between the second end portion 32*b* of the distal body 32 and the first end portion 31*a* of the base body 31; this maximum length may for example be equal to or greater than 600 mm, optionally comprised between 600 and 2000 mm.

From a structural point of view, the first end portion 32*a* of distal body 32 comprises a respective engagement portion coupled with the engagement portion of the base body. In detail, the engagement portion of the distal body 32 comprises at least one plate 34 at least partially overlapping plate 35 of the base body 31. In the embodiment in which the base body 31 has two spaced apart plates 35, plate 34 of the distal body 32 is placed between the two plates 35. Plate 34 of the distal body 32 comprises a respective through hole aligned with the at least one through hole of plate 35 of the base body 31. The base body 31 is engaged to the distal body 32 by cylindrical pin 39 (FIG. 4) which crosses the through-holes of the respective plates 34 and 35 (the at least one plate 35 of the base body and the plate 34 of the distal body 32).

Figure 7:
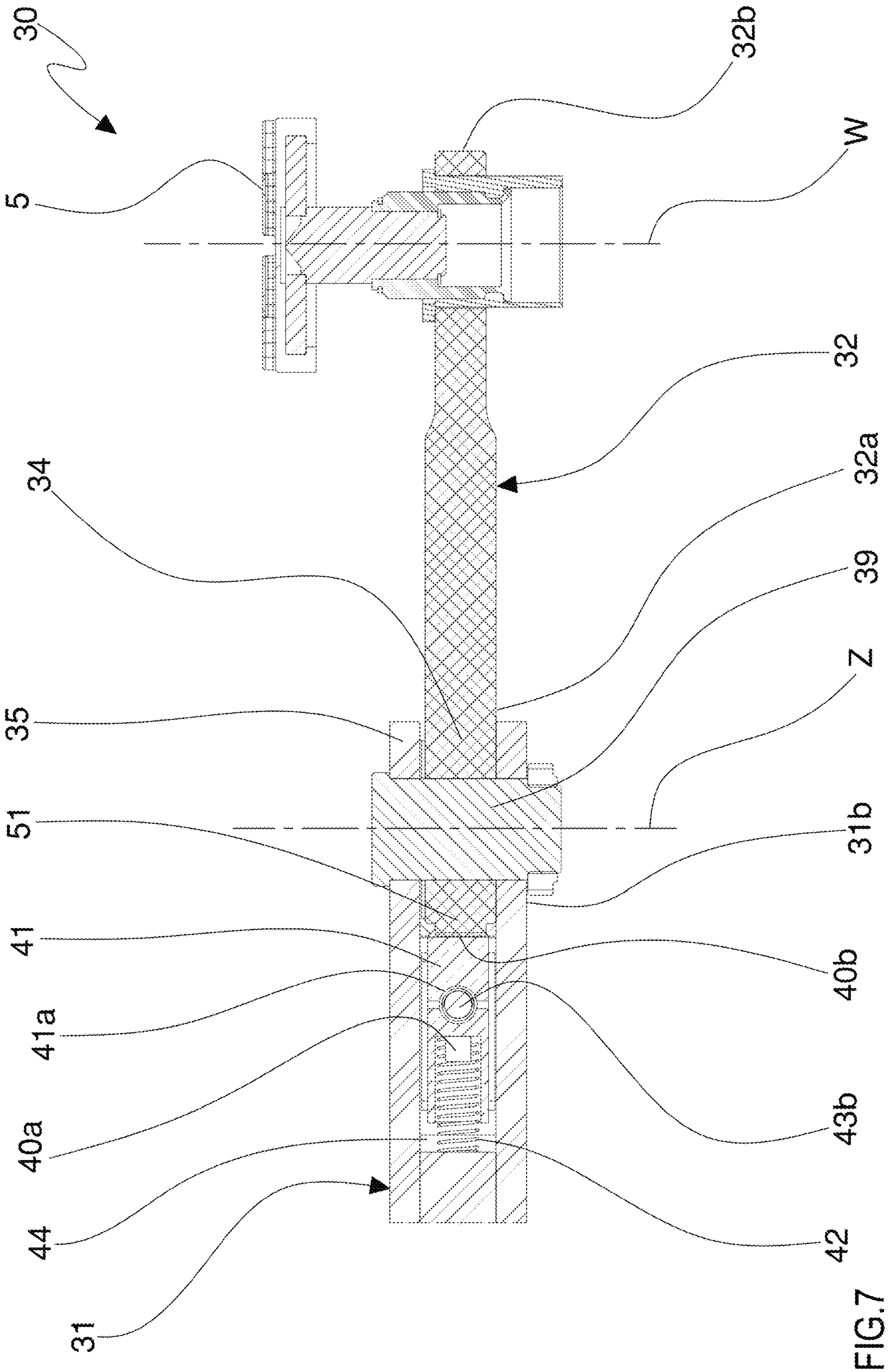
FIGS. 7 and 8 are sectional views of a lift arm according to the present invention.

Lift arm 30 may further comprise at least one support 5 carried by the distal body 32 and configured to contact at least one vehicle during lifting. In detail, the support 5 is arranged at the second end portion 32*b* of the distal body 32 and protrudes from the distal body along a direction which is transverse, optionally orthogonal, to the extension path T of the distal body and to the ideal plane defined by the extension paths D and T of the base body 31 and the distal body 32. Support 5 may move towards and away from distal body 32 at least along a transverse direction, optionally orthogonal, to the ideal plane. As schematically shown in FIG. 7, also support 5 may turn, for example freely turn, with respect to distal body 32 about axis W; axis W may be substantially parallel to axis Z of rotation of the base body 31 relative the distal body 32.

Lift arm 30 further comprises a lock 40 configured to block relative rotation between the base body 31 and the distal body 32. The base body 31 and the distal body 32 are movable with respect to each other such that the distal body 32 can be oriented to properly contact the vehicle body without causing damage to vehicle parts (for example to a vehicle battery pack). However, after having properly orientated the distal body 32, the relative position between the distal body 32 and the base body 31 must be locked to provide the lift arm with a certain stability and to avoid undesired movements that could cause the vehicle roll over lift arm 30. Lock 40 allows quick and effective locking/unlocking of the relative movement (namely of the relative rotation) between base body 31 and distal body 32.

In detail, the lock 40 may comprise at least one insert 41 movable at least between:

a release position (see, for example, FIG. 6) where insert 41 allows relative rotational movement between base body 31 and distal body 32, and a gripping position (see, for example, FIGS. 5, 5A and 7) where insert 41 blocks relative rotational movement between base body 31 and distal body 32.

Insert 41 is carried by at least one of the base body 31 and the distal body 32: insert 41 is slidingly movable with respect to at least one of said base body 31 and said distal body 32 between the gripping position and the release position, and vice versa: more in detail insert 41 displaces along a movement trajectory substantially parallel to at least one of a section of the extension path D of base body 31 and a section of the extension path T of distal body 32.

In the accompanying figures, a non-limiting example of an insert 41 carried directly by the base body 31 is shown; in such a configuration, the insert 41 is slidingly movable between the gripping position and the release position, and vice versa, along a trajectory substantially parallel to the extension path D of the base body 31.

From a structural point of view, insert 41 has a substantially parallelepiped, optionally rectangular parallelepiped, shape, and longitudinally extends between a head surface 40*b* facing the distal body 32, and a bottom surface 40*a* facing the first end portion 31*a* of the same base body 31 carrying the insert 41.

In such configuration, the insert 41 (carried by the base body 31) has an engagement portion 46 which, in the gripping position, couples with an engagement portion 50 of the distal body 32: the engagement portion 46 of the insert 41 emerges from the head surface 40*b* in the direction of the distal body 32.

For example, the engagement portion 46 of the insert 41 may comprise at least one tooth 46*a* configured to cooperate with a toothed profile 51 of the engagement portion 50 of the distal body 32; in particular, the engagement portion 46 of the insert 41 may comprise a plurality of teeth 46*a* (see, for example, FIG. 6) configured to cooperate with the toothed profile 51 of the engagement portion 50 of the distal body 32. The teeth 46*a* of the engagement portion 46 of the insert 41 may be aligned along a direction which is transverse, optionally orthogonal, to the movement direction of the insert 41; alternatively, the teeth 46*a* of the engagement portion 46 of the insert 41 may be aligned according to an alignment direction, which is orthogonal to the extension path D of the base body 31 and parallel to the mentioned ideal plane. As shown in the accompanying figures, the head surface 40*b* may be flat and the plurality of teeth 46*a* may emerge from said flat head surface 40*b*.

It is not excluded the possibility of a curved head surface 40*b*: the plurality of teeth 46*a* of the insert 41 would in this case be aligned along an arc profile defining a portion of a toothed wheel suitable to engage the toothed profile 51 of the distal body 32. For example, the insert 41 may have a number of teeth 46*a* equal to or greater than 2, optionally between 3 and 5.

Similarly, the toothed profile 51 of the engagement portion 50 of the distal body 32 may comprise, in a non-limiting way, a plurality of teeth aligned along a respective arc shaped trajectory; the plurality of teeth of the engagement portion 50 of the distal body 32, in the gripping position of the insert 41, cooperate with the at least one tooth 46*a* of the engagement portion 46 of the insert 41 to block relative rotation between the base body 31 and the distal body 32. The arc-shaped trajectory of alignment of the teeth of toothed profile 51 lies in a plane substantially parallel to the ideal plane described above. In detail, the toothed profile 51 is defined at the first end portion 32*a* and is directed towards the base body 31; the toothed profile 51 emerges substantially from a curved end surface of distal body 32 and therefore directly faces tooth 46*a* of insert 41 (see, for example, the detail FIGS. 5A and 6).

However, it is not excluded the possibility of a toothed profile 51 arranged along a rectilinear trajectory, i.e., emerging towards the base body 31 from a flat end surface of distal body 2 (condition not illustrated).

The insert 41 may be placed at an external surface of the base body 31 or integrated within the base body 31. A currently preferred lift arm 30 with the insert 41 placed within a seat 44 of the base body 31 is shown in the accompanying FIGS. 5-6.

In detail, the seat 44 is placed at the second end portion 31*b* and has a substantially "U" shape, with concavity directed towards the distal body 32: the seat 44 of the base body 31 is open, and optionally delimited by an open profile. In fact, the seat 44 is at least partially counter-shaped to the insert 41 so that the latter is guided in its movement between the release position and the gripping position, and vice versa.

As can be seen for example from FIG. 6, insert 41, at least in the release position, is entirely housed in the seat 44 of the base body 31. In the gripping position, the head surface 40*b* of the insert 41 is placed near a front free edge of said seat: the at least one tooth 46*a* (optionally the plurality of teeth 46*a*) of insert 41, in the gripping position, at least partially protrudes from seat 44 to contact the toothed profile 51 of the distal body.

In a non-limiting embodiment of the lift arm 30, lock 40 comprises a return element 42 configured to thrust on the insert 41 and force it to normally stay in the gripping position. Return element 42 is configured to normally keep insert 41 in the gripping position where insert 41 is constrained to the engagement portion 50 of the distal body 32 to thereby prevent relative rotation between the base body 31 and the distal body 32.

In detail, the return element 42 on one side contacts the base body 31 and, on the other side, contacts the insert 41 and pushes insert 41 to keep it normally in the gripping position. In greater detail, return element 42 is placed entirely inside seat 44 between a bottom wall of the seat 44 and the bottom wall 40*a* of the insert: the return element pushes the bottom of insert 41 to force the engagement of tooth 46*a* with toothed profile 51 of the distal body 32.

The return element 42 may be an elastic return element; for example, the return element 42 may comprise at least one of: a torsion spring, a compression spring, a tension spring, an air spring, a leaf spring.

In a non-limiting embodiment of the lift arm 30, the return element comprises a compression spring on one side resting on the bottom wall of the seat (wall directly facing the bottom surface 40*a* of the insert 41), and on the opposite side at least partially housed inside a guide seat on bottom surface 40*a* of the insert; in this way, the compression spring is kept in a correct working position by the guide seat, avoiding undesired spring blockages.

It is not excluded the possibility of using a different return element 42, for example an actuator comprising at least one of: a magnetic or electromagnetic actuator, a hydraulic actuator, or a pneumatic actuator.

The insert 41 may be moved from the gripping position to the release position by an operator manual action or by an actuator, for example comprising at least one of: a magnetic or electromagnetic actuator, a hydraulic actuator or a pneumatic actuator.

Lift arm 30 may also comprise at least one maneuvering element 43 engaged to the insert 41 and emerging from at least one of the base body 31 and the distal body 32 (in the embodiment shown, the maneuvering element directly protrudes from the base body 31); the maneuvering element 43 is configured to be manually operated to move the insert 41 at least between the gripping position and the release position.

In detail, the maneuvering element 43 includes a push portion 43*b* directly engaged to the insert 41 and a lever 43*a* allowing an operator to impose a movement to the insert 41 at least between the gripping position and the release position.

In detail, the insert 41 may comprise at least one seat 41*a* (FIG. 7) within which the thrust portion 43*b* of the maneuvering element 43 is engaged. In the accompanying figures, seat 41*a* of insert 41 has a cylindrical shape and thrust portion 43*b* of the maneuvering element 43 comprises a cylindrical pin at least partially counter-shaped to seat 41*a*. The thrust portion 43*b* is displaced thanks to manual intervention of the operator, from outside the base body 31, on lever 43*a*: displacement of the thrust portion 43*b* allows guiding the sliding insert from the gripping position to the release position to allow consequent disengagement of tooth 46*a* from toothed profile 51.

FIG. 5A shows the maneuvering element 43 which, in addition to being engaged in the insert 41 by means of the thrust portion 43*a*, further has a support end 43*c* contacting the base body 31. In detail, the base body 31 has a recess 47 delimited by at least one abutment wall; recess 47 is placed at the side of seat 44 of the same base body 31: in particular, recess 47 and seat 44 of base body 31 are in communication with each other and define a single pocket suitable to receive insert 41 and at least part of maneuvering element 43 (see, for example, FIG. 5A).

The support end 43*c* of maneuvering element 43 opposed to lever 43*a* positions within recess 47, resting against the abutment wall of recess 47 to allow an operator, during (optionally manual) movement of the maneuvering element 43 from the gripping position to the release position, to leverage abutment wall of the recess 47.

Following operation of the lever 43*a* and movement of insert from the gripping position to the release position, base body 31 may relative turn with respect to the distal body 32 so that the latter can be properly oriented. Once the desired orientation of the distal body 32 relative to the base body 31 has been reached, the operator in charge can release lever 43*a* of the maneuvering element so that return element 42 can quickly return insert 41 (sliding the same along extension path D or along the extension path T) to the gripping position in which tooth 46*a* of the insert is stably engaged to toothed profile 51.

Insert 41 may be directly carried by the base body 31 and movable with respect to the latter along the extension path D, as shown in the accompanying figures. It is not excluded the possibility to arrange an insert 41 directly carried by distal body 32 and slidingly movable with respect to the latter along extension path T. In such configuration, the insert 41 would be arranged in proximity of the first end portion 32*a* of the distal body 32, directly facing a portion of engagement of the base body 31, which would be placed at the second end portion 31*b* of the base body 31, directly facing the insert 41.

Lift 1

A vehicle lift 1 is also described, for example usable in the automotive industry for servicing various types of vehicles, including: passenger cars, trucks or agricultural vehicles.

Lift 1 may comprise at least one column 2 extending, in use, along a vertical direction between a base portion 2*a* and a top portion 2*b* (see, for example, FIG. 1). Column 2 defines the vertical support element which may be fixed to the ground and configured to support the vehicle above the ground; column 2 may be fixed to the ground, for example by means of screw-bolt systems. Column 2 may comprise a base plate 20, optionally made of metal, configured to be fixed to the ground. A support frame 21 also for example made of metal extends from base plate 20. The support frame 21 is, in the example shown, joined in one piece to base plate 20; frame 21 may be hollow to internally accommodate one or more components of the lift 1, as better described below. The support frame 21 may have, along its entire extension, a constant profile cross-section, optionally having a substantially "C" or substantially "V" shaped profile. In detail, the support frame 21 is made of one or more layers of sheet metal.

The lift 1 may comprise a single column 2 or a plurality of distinct and spaced apart columns 2. FIG. 1 illustrates an exemplary lift 1 comprising two columns 2 (a first and a second column): the columns are spaced apart from each other and extend, parallel to each other, along a vertical direction. The columns are spaced apart to allow positioning of at least one vehicle between the columns.

Lift 1 comprises at least one carriage 3 engaged with column 2 and slidingly movable along the latter. In detail, lift 1 includes a carriage 3 for each column 2 of the lift; the carriage 3 is a mobile element of lift 1 carrying an arm 30 adapted to lift and lower a vehicle with respect to the ground, for example to allow an operator to service the vehicle. Carriage 3 is mobile along column 2 towards and away from base portion 2*a* or plate 20.

Carriage 3 carries at least one lift arm 30 according to the above description and/or according to any one of the accompanying claims. As described above, lift arm 30 is configured to contact the vehicle under service, optionally the vehicle body, to allow lifting and lowering: lift arm 30 is positioned transverse to, for example orthogonal to, column 2. As mentioned above, lift arm 30 may be oriented, i.e., movable relative to the carriage by rotation about an axis Y, parallel to the direction of extension of column 2: rotation axis Y may develop outside support frame 21 as, for example, illustrated in FIG. 1. In detail, carriage 3 includes a coupling portion configured to abut on attachment portion 33 of lift arm 30 to define a hinge-type joint (optionally a flat hinge).

The axis of rotation Y of lift arm 30 with respect to carriage 3 is substantially parallel to axis Z of relative rotation between base body 31 and distal body 32 (see, for example, FIG. 2).

Carriage 3 may comprise two lift arms 30 (see, for example, FIGS. 1 and 2) both configured to contact a vehicle, optionally the vehicle body, to enable lifting. Lift arms 30 are transverse to column 2 and may lie in a single plane orthogonal to the direction of extension of column 2. At least one of said lift arms 30 may be orientable, i.e., movable by rotation about a respective axis Y parallel to a column extension direction. Lift 1 of FIGS. 1 and 2 has a first and second lift arms both being orientable; in addition or alternatively, at least one of the lift arms may be extendable.

As specified above, lift 1 may comprise a first and a second column. If lift 1 comprises only one column, then lift 1 also has only one carriage 3. FIG. 1 shows an exemplary lift 1 having a first and a second column each of which comprises a carriage 3 according to above description.

Each carriage 3 moves along the respective column 2 by action of a movement system 4 of known type, for example by means of one or more hydraulic actuators or by means of a screw-nut system operated by an electric motor 7. In FIG. 1, a column lift is shown having a movement system comprising an electric motor 7 for each column housed inside a specific casing 15 arranged at the top portion 2*b* of the column 2.

Lifting Process

It is also an aspect a process for lifting vehicles using a lift 1 according to the above description and/or according to any one of the accompanying claims.

The process involves the following steps:

- arranging carriage 3 in proximity to the ground where lift 1 is positioned, for example operating electric motor 7 and causing sliding of the carriage along column 2 towards the ground,
- placing a vehicle above at least one lift arm 30,
- moving carriage 3 along column 2 to bring the at least one lift arm 30 into contact with the vehicle (optionally with the vehicle body) to lift the vehicle above the ground.

Following placing of the vehicle above the lift arm 30 and prior to contacting the vehicle with the arm 30, the process may include a step of orienting distal body 32 with respect to base body 31 to place the distal body at a desired angle with respect to the base body 31. The orientation step allows lift arm 30 to properly contact the vehicle (e.g., the vehicle body) without causing any damage to components of the vehicle, such as the battery pack of an electric car (fully hybrid or plug-in car).

This orientation step may include the following sub-steps:

- arranging insert 41 of lock 40 in the release position so that base body 31 and distal body 32 are relatively movable by rotation,
- rotating distal body 32 with respect to base body 31 about the respective axis Z to arrange said distal body at a desired angle with respect to the base body 31,
- arranging insert 41 of lock 40 in the gripping position to lock said distal body 32 and base body 31 at the desired angle; this step of arranging the insert 41 in the gripping position may be performed by return element 42 following release of lever 43.

The sub-step of arranging the insert 41 in the release position comprises the further sub-steps of manually moving lever 43*a* of maneuvering element 43 such that thrust portion 43*b* may act on insert 41 to disengage the at least one tooth 46*a* thereof from the toothed profile 51 of distal body 32.

After having correctly oriented distal body 32 and base body 31, the process may proceed with the lifting of the arm 30, for example by moving carriage 3 along the column, e.g., by operating electric motor 7: the arm 30, after having contacted the vehicle, lifts the vehicle above the ground.

Use of an insert 41 movable along the base body 31 and/or the distal body 32 can provides a safe and compact lock 40 allowing an operator to quickly lock and unlock the base body 31 and the distal body 32. In fact, as the insert moves along base body 31, elements protruding from the lift arm are minimized thus minimizing risks of inadvertent activation by an operator/vehicle.

Moreover, the structure of the lift arm 30 can provide a wide positioning area of the support 5 thanks to the presence of the joint between the base body 31 and the distal body 32, which therefore avoids undesired contacts with car components, for example with the battery pack of electric cars which, when removed, needs to move along a vertical downward direction under the vehicle: the particular structure of the lift arm therefore can allow easy removal of the battery of an electric vehicle.

What is claimed is:

1. A vehicle lift, comprising:

at least one column extending, in use, along a vertical direction, at least one carriage engaged to the column and slidingly movable along said column, and at least one lift arm carried by the carriage, wherein said lift arm comprises:

a base body extending between respective first and second end portions of the base body along a respective extension path, a distal body extending between respective first and second end portions of the distal body along a respective extension path, wherein the distal body is rotatably mounted to the base body for relative rotation about at least one axis, and a lock configured to selectively block the relative rotation between the base body and the distal body, said lock comprising an insert movable between:

a release position wherein said insert allows relative rotation between the base body and said distal body, and a gripping position wherein said insert blocks relative rotation between the base body and said distal body, wherein the insert comprises at least one engagement portion constraining the distal body and blocking relative rotation between the distal body and the base body, wherein the engagement portion includes at least one tooth configured to cooperate with a toothed profile of the distal body, wherein the toothed profile is defined at the first end portion of the distal body and faces the at least one tooth of the engagement portion, and wherein said insert is carried by at least one of the base body and the distal body, wherein the insert is slidingly movable with respect to at least one of the base body and the distal body from the gripping position to the release position, and from the release position to the gripping position, along a movement trajectory substantially parallel to at least one of a section of the extension path of the base body and a section of the extension path of the distal body wherein the insert extends between:

a head surface facing the distal body, and a bottom surface facing towards the first end portion of the base body, wherein the engagement portion of the insert emerges from the head surface towards the distal body, wherein the second end portion of the base body has a seat, wherein the insert is slidingly engaged in the seat along the movement trajectory, wherein the lock comprises at least one return element in contact, on one side, with the base body and, on another side, with the insert, and wherein the return element is configured to maintain the insert in the gripping position, and wherein the return element is placed inside the seat of the base body, between a bottom wall of the seat and the bottom surface of the insert.

2. The vehicle lift of claim 1, wherein the second end portion of the base body is hinged to the first end portion of the distal body, wherein an axis of relative rotation between the base body and the distal body is orthogonal both to the extension path of the base body, and to the extension path of the distal body.

3. The vehicle lift of claim 1, wherein the base body and the distal body are movable at least between:

an aligned position wherein the extension paths respectively of the base body and the distal body are parallel to each other, an offset position wherein the extension paths respectively of the base body and the distal body are angularly offset from each other, wherein, in the offset position, the extension paths respectively of the base body and the distal body intersect on an ideal plane, and wherein the axis of relative rotation between the base body and the distal body is orthogonal to said ideal plane.

4. The vehicle lift of claim 1, wherein the insert is carried by the base body, wherein the insert is slidingly movable between the gripping position and the release position, and from the release position to the gripping position, along a movement trajectory parallel to the extension path of the base body.

5. The vehicle lift of claim 1, wherein the toothed profile of the distal body comprises a plurality of teeth aligned along a circular arc and configured, in the gripping position of the insert, to cooperate with the at least one tooth of the engagement portion to block relative rotation between the base body and the distal body.

6. The vehicle lift of claim 1, wherein the engagement portion comprises a plurality of teeth configured to cooperate with a toothed profile of the distal body, and wherein the plurality of teeth of the engagement portion are aligned along a direction orthogonal with respect to the movement trajectory of the insert.

7. The vehicle lift of claim 1, wherein the return element comprises at least one of a torsion spring, a compression spring, a tension spring, a pneumatic spring, and a leaf spring.

8. The vehicle lift of claim 1, wherein the seat has a profile with concavity directed towards the distal body, and wherein the insert is at least partially counter-shaped to the seat of the base body.

9. The vehicle lift of claim 1, wherein the lock comprises at least one maneuvering element engaged to the insert and emerging from at least one of the base body and the distal body, said maneuvering element being configured to move the insert at least between the gripping position and the release position, wherein the maneuvering element comprises:

a thrust portion engaged within a seat of the insert, and a lever configured to allow manual movement of the insert by an operator at least between the gripping position and the release position.

10. The vehicle lift according to claim 9, wherein the maneuvering element is engaged to the insert and the base body, wherein the base body has a recess bounded by at least one contrast wall, wherein the maneuvering element comprises at least one support end configured to contact the contrast wall of the recess to allow an operator, during movement of the maneuvering element from the gripping position to the release position, to leverage the contrast wall of the base body.

11. The vehicle lift according to claim 10, wherein the recess is placed at the side of the seat of the base body.

12. The vehicle lift according to claim 10, wherein the recess and the seat of the base body communicate with each other and define a single pocket suitable for receiving the insert and at least part of the maneuvering element.

13. The vehicle lift of claim 1, wherein the lift arm is rotatably mounted to said carriage for relative rotation about an axis parallel to the vertical direction of said column.

14. The vehicle lift according to claim 1, wherein the extension path of the base body is rectilinear, wherein the insert is slidingly movable between the gripping position and the release position along a movement trajectory parallel to the extension path of the base body.

15. The vehicle lift according to claim 1, wherein the base body has an elongated conformation and has a respective length defined by the maximum distance present between the first and second end portions of the base body, wherein the distal body has an elongated conformation and has a respective length defined by the maximum distance present between the first and second end portions of the distal body, wherein a ratio between the length of the base body and the length of the distal body is greater than 3.

16. The vehicle lift according to claim 1, wherein the return element thrusts the bottom surface of the insert to force the engagement portion of the insert against the engagement portion of the distal body.

17. The vehicle lift according to claim 1, wherein the return element comprises a compression spring which, on one side, rests on the bottom wall of the seat, and on the opposite side, is at least partially housed inside a guide seat on bottom surface of the insert.

18. The vehicle lift according to claim 1, wherein the base body comprises at least one attachment portion configured to hinge the lift arm to the carriage.

* * * * *